(12) United States Patent
Fujishiro et al.

(10) Patent No.: US 11,337,138 B2
(45) Date of Patent: May 17, 2022

(54) RADIO COMMUNICATION APPARATUS AND PROCESSOR

(71) Applicant: KYOCERA Corporation, Kyoto (JP)

(72) Inventors: Masato Fujishiro, Yokohama (JP); Hiroyuki Urabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 47 days.

(21) Appl. No.: 16/549,361

(22) Filed: Aug. 23, 2019

(65) Prior Publication Data

US 2019/0380085 A1 Dec. 12, 2019

Related U.S. Application Data

(63) Continuation of application No. PCT/JP2018/004600, filed on Feb. 9, 2018.

(30) Foreign Application Priority Data

Feb. 24, 2017 (JP) .............................. JP2017-033119

(51) Int. Cl.
*H04W 48/02* (2009.01)
*H04W 76/27* (2018.01)
*H04W 48/08* (2009.01)
*H04W 48/18* (2009.01)

(52) U.S. Cl.
CPC ........... *H04W 48/02* (2013.01); *H04W 48/08* (2013.01); *H04W 48/18* (2013.01); *H04W 76/27* (2018.02)

(58) Field of Classification Search
CPC ..... H04W 48/02; H04W 76/27; H04W 48/08; H04W 48/18; H04W 28/10; H04W 76/28; H04W 24/10; H04W 4/70; H04W 52/0216; H04W 74/0833; H04L 47/29; H04L 47/70
See application file for complete search history.

(56) References Cited

U.S. PATENT DOCUMENTS

| | | | | |
|---|---|---|---|---|
| 2002/0075891 A1* | 6/2002 | Souissi | ............... | H04W 74/085 370/442 |
| 2009/0023453 A1* | 1/2009 | Hu | ........................ | H04W 48/17 455/452.1 |
| 2010/0240377 A1* | 9/2010 | De Pasquale | ......... | H04W 28/16 455/445 |
| 2012/0281531 A1* | 11/2012 | Susitaival | ............. | H04W 48/06 370/230 |

(Continued)

FOREIGN PATENT DOCUMENTS

| | | |
|---|---|---|
| JP | 2007-235654 A | 9/2007 |
| JP | 2009-005203 A | 1/2009 |
| WO | 2013/021532 A1 | 2/2013 |

OTHER PUBLICATIONS

Yoshinori Izawa et al.; "Development of Elemental Technology for Cost Reduction and Maintaining Communication Quality for M2M System"; Panasonic Technical Journal; Nov. 2015; pp. 130-135; vol. 61, No. 2.

*Primary Examiner* — Michael K Phillips
(74) *Attorney, Agent, or Firm* — Studebaker & Brackett PC

(57) ABSTRACT

A radio communication apparatus according to a first embodiment comprises a controller. The controller is configured to specify a first time period in which communication with a network is restricted, and perform control in the first time period to restrict the communication with the network.

8 Claims, 8 Drawing Sheets

(56) References Cited

U.S. PATENT DOCUMENTS

| | | | |
|---|---|---|---|
| 2013/0136072 A1* | 5/2013 | Bachmann | H04W 68/00 370/329 |
| 2014/0004832 A1* | 1/2014 | Dabbiere | H04L 63/0876 455/411 |
| 2014/0148169 A1* | 5/2014 | Li | H04W 36/0061 455/437 |
| 2014/0162647 A1 | 6/2014 | Kato | |
| 2016/0255671 A1* | 9/2016 | Rahman | H04B 17/364 370/329 |
| 2018/0220345 A1* | 8/2018 | Moon | H04B 7/0695 |
| 2019/0306917 A1* | 10/2019 | Takahashi | H04W 72/12 |
| 2019/0327679 A1* | 10/2019 | Gupta | H04W 52/0229 |

* cited by examiner

RADIO COMMUNICATION APPARATUS AND PROCESSOR

RELATED APPLICATIONS

The present application is a continuation based on PCT Application No. PCT/JP2018/004600, filed on Feb. 9, 2018, which claims the benefit of Japanese Patent Application No. 2017-033119 (filed on Feb. 24, 2017). The content of which is incorporated by reference herein in their entirety.

TECHNICAL FIELD

The present disclosure relates to a radio communication apparatus and a processor.

BACKGROUND ART

As radio communication apparatuses that perform machine-to-machine (M2M) communication become more widespread, traffic is expected to increase.

To reduce a maximum value of overall traffic including traffic for an M2M service and traffic for services other than M2M, a method of controlling a communication timing of a radio communication apparatus by an M2M server is being proposed.

The M2M server determines a communication time of a radio communication apparatus on a per radio communication apparatus basis by taking into account predicted traffic for services other than M2M. At a time of performing communication with the radio communication apparatus, the M2M server notifies of the determined communication time as a next communication timing.

The M2M server may assign a communication timing to a radio communication apparatus, to a time when the overall traffic becomes the minimum. This enables smoothing of overall traffic.

SUMMARY

A radio communication apparatus according to a first embodiment comprises a controller. The controller is configured to specify a first time period in which communication with a network is restricted, and perform control in the first time period to restrict the communication with the network.

A processor according to a first embodiment is a processor for controlling a radio communication apparatus. The processor is configured to specify a first time period in which communication with a network is restricted, and perform control in the first time period to restrict the communication with the network.

DESCRIPTION OF THE EMBODIMENT

Outline of Embodiment

A radio communication apparatus according to an embodiment includes a controller. The controller is configured to specify a first time period in which communication with a network is restricted, and perform control for restricting communication with the network in the first time period.

The controller may be configured to specify a second time period in which communication with the network is allowed, and may perform the communication in the second time period without performing the communication in the first time period.

The controller may be configured to transmit data to the network in the first time period, in a case where an allowable delay time for the data that is to be transmitted to the network elapses in the first time period.

The controller may be configured to receive, from the network, information including at least one of a first information element for specifying the first time period and a second information element for specifying a second time period in which the communication with the network is allowed, and specify the first time period on a basis of at least one of the first information element and the second information element.

The controller may be configured to determine whether or not to transmit data to the network in the first time period, on a basis of information associating a predetermined value for restricting transmission to the network and a time period.

The controller may be configured to determine whether or not to transmit data to the network in the first time period, on a basis of information associating a network operator and a time period.

The controller may be configured to select a network operator from a plurality of network operators, on a basis of the information, and determine to transmit data to a network managed by the network operator that is selected.

The controller may be configured to determine whether or not to transmit data to the network in the first time period, on a basis of information associating a predetermined value based on a use fee and a time period.

A processor according to an embodiment is a processor for controlling a radio communication apparatus. The processor is configured to specify a first time period in which communication with a network is restricted, and perform control in the first time period to restrict the communication with the network.

Figure 1:
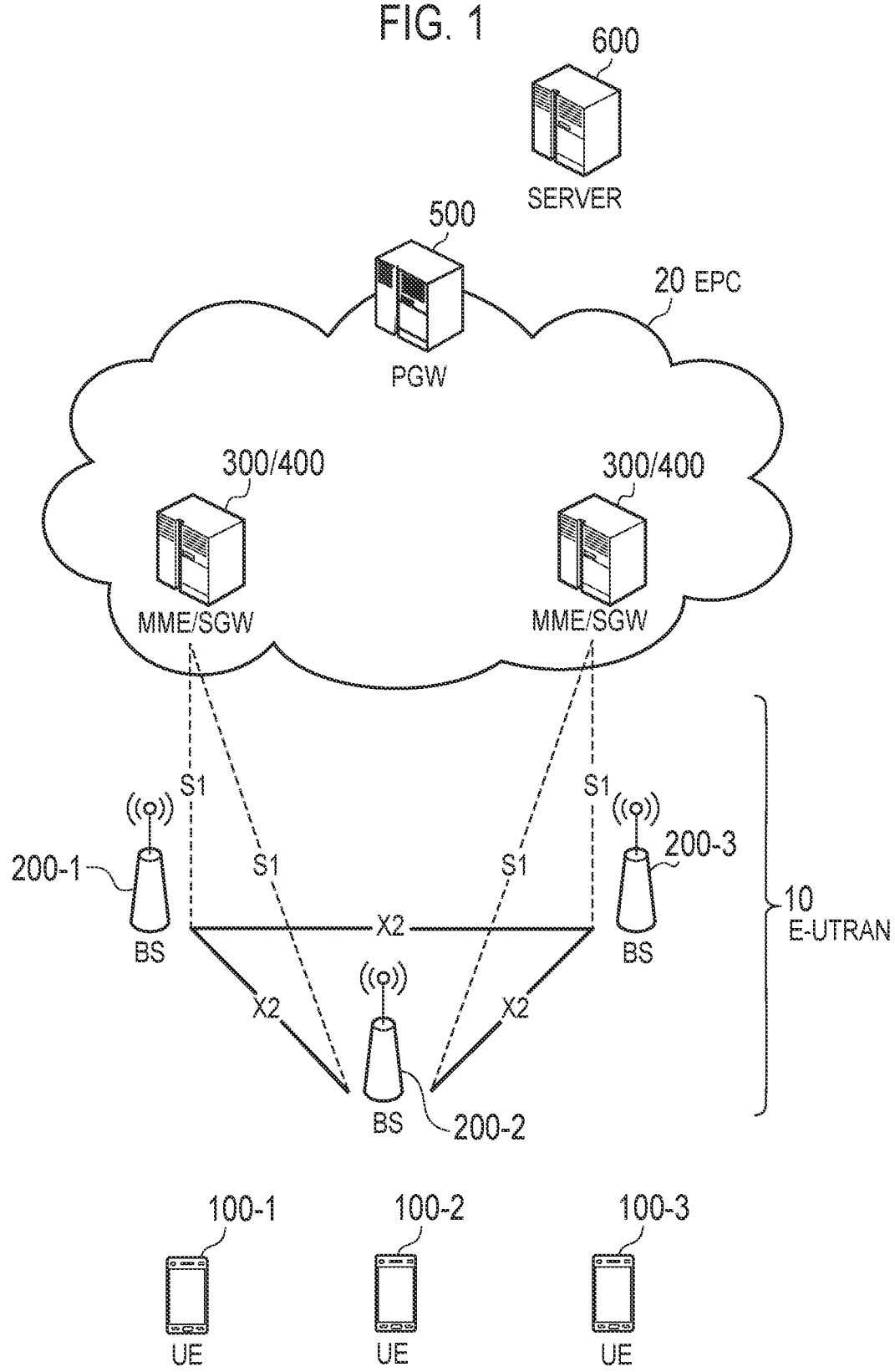
FIG. 1 is a diagram illustrating a configuration of a mobile communication system.

Embodiment (Mobile Communication System)
In the following, a description will be given of a mobile communication system. FIG. 1 is a diagram illustrating a configuration of the mobile communication system. A description will be given citing an LTE system as an example of the mobile communication system.

As illustrated in FIG. 1, the LTE system includes a user equipment (UE) 100, an evolved universal terrestrial radio access network (E-UTRAN) 10, and an evolved packet core (EPC) 20.

The UE 100 corresponds to a radio communication apparatus (such as a radio terminal). The UE 100 is a mobile radio communication apparatus. The UE 100 may be a radio communication apparatus that uses Narrow Band Internet of Things (Nb-IoT). The UE 100 may perform radio communication with a cell (a BS 200 described later). A configuration of the UE 100 will be described later.

The E-UTRAN 10 corresponds to a radio access network. The E-UTRAN 10 includes a base station (BS) 200. The E-UTRAN 10 may be referred to as a mobile network operator (MNO) network (MNO-NW) in a case of being managed by a predetermined (mobile) network operator.

The BS 200 corresponds to a base station. For example, the BS 200 is an evolved Node-B (eNB) 200. The BS 200 may be a node which is capable of performing radio communication with the UE 100. For example, the BS 200 may be a next Generation Node-B (gNB). The BSs 200 may be interconnected via an X2 interface. A configuration of the BS 200 will be described later.

The BS 200 manages one or a plurality of cells. The BS 200 performs radio communication with the UE 100 which established connection with a cell that is managed by the BS 200. The BS 200 includes a radio resource management (RRM) function, a routing function for user data (hereinafter sometimes referred to as "data"), and a measurement control function for mobility control and scheduling, for example.

The "cell" is used as a term indicating a minimum unit of radio communication area. The "cell" may also be used as a term indicating a function of performing radio communication with the UE 100. The "cell" may be downlink resources. The "cell" may be a combination of the downlink resources and uplink resources. Linking between a carrier frequency of the downlink resources and a carrier frequency of the uplink resources may be included in system information transmitted on the downlink resources.

The EPC 20 corresponds to a core network. The EPC 20 may configure a network, together with the E-UTRAN 10. The EPC 20 may include a mobility management entity (MME) 300, a serving gateway (SGW) 400, and a packet data network gateway (PGW) 500.

For example, the MME 300 performs various types of mobility control on the UE 100. For example, the SGW 400 performs data transfer control. The MME 300 and the SGW 400 are connected to the BS 200 via an S1 interface.

For example, the PGW 500 performs control of relaying user data from an external network (and to the external network). For example, the PGW 500 may perform packet filtering on a per user basis.

A Server 600 may be provided in the external network. The Server 600 may be a server (M2M server) that manages a radio communication apparatus that performs M2M communication. In the M2M communication, apparatuses perform communication without human intervention.

A network operator that manages a network that is formed by the Server 600 (and a router) may be referred to as a mobile virtual network operator (MVNO). A network that is managed by the MVNO may be referred to as an MVNO-NW. The MVNO-NW may include the PGW 500. The MVNO-NW may include a remote authentication dial in user service (RADIUS) for managing determination of availability of network resources (authentication) and recording of a fact of use (accounting).

The Server 600 may be a home subscriber server (HSS) that manages subscriber information such as a terminal identification number.

Figure 2:
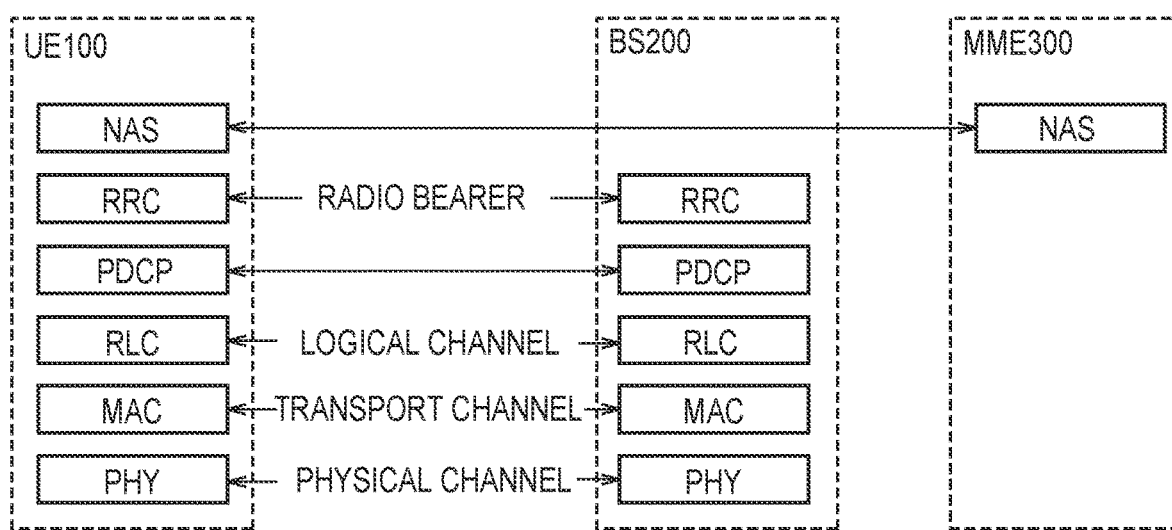
FIG. 2 is a protocol stack diagram of a radio interface.

FIG. 2 is a protocol stack diagram of a radio interface in the LTE system. As illustrated in FIG. 2, a radio interface protocol is classified into a first layer (layer 1) to a third layer (layer 3) of an OSI reference model. The first layer is a physical (PHY) layer. The second layer (layer 2) includes a medium access control (MAC) layer, a radio link control (RLC) layer, and a packet data convergence protocol (PRCP) layer. The third layer (layer 3) includes a radio resource control (RRC) layer.

The physical layer performs encoding and decoding, modulation and demodulation, antenna mapping and demapping, and resource mapping and demapping. Data and control signals are transmitted between the physical layer of the UE 100 and the physical layer of the BS 200 through a physical channel.

The MAC layer performs preferential control of data, a retransmission process by hybrid ARQ (HARQ), a random access procedure, and the like. Data and control signals are transmitted between the MAC layer of the UE 100 and the MAC layer of the BS 200 through a transport channel. The MAC layer of the BS 200 includes a scheduler (MAC scheduler). The scheduler determines a transport format (a transport block size, a modulation and coding scheme (MCS)) of an uplink and a downlink, and a resource block to be allocated to the UE 100.

The RLC layer transmits data to a receiving-side RLC layer by using functions of the MAC layer and the physical layer. Data and control signals are transmitted between the RLC layer of the UE 100 and the RLC layer of the BS 200 through a logical channel.

The PDCP layer performs header compression and decompression, and encryption (ciphering) and decryption (deciphering).

The RRC layer is defined only in a control plane where control signals are handled. Messages (RRC messages) for various settings are transmitted between the RRC layer of the UE 100 and the RRC layer of the BS 200. The RRC layer controls the logical channel, the transport channel, and the physical channel in response to establishment, re-establishment, and release of a radio bearer. In a case where there is an RRC connection between the RRC of the UE 100 and the RRC of the BS 200, the UE 100 is in an RRC connected state. In a case where there is no RRC connection between the RRC of the UE 100 and the RRC of the BS 200, the UE 100 is in an RRC idle state.

A non-access stratum (NAS) layer located above the RRC layer performs session management and mobility management, for example.

(Radio Terminal)

Figure 3:
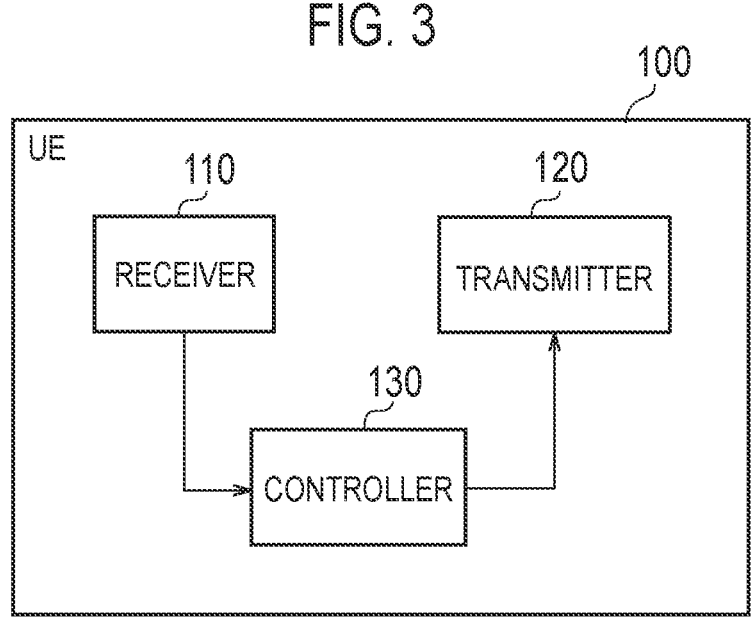
FIG. 3 is a block diagram of an UE 100.

A description will be given of the UE 100 (radio terminal) according to the embodiment. FIG. 3 is a block diagram of the UE 100. As illustrated in FIG. 3, the UE 100 includes a receiver 110, a transmitter 120, and a controller 130. The receiver 110 and the transmitter 120 may be an integrated transceiver.

The receiver 110 performs various types of reception under control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmission under control of the controller 130. The transmitter 120 includes an antenna. The transmitter 120 converts the baseband signal (transmission signal) output by the controller 130 into a radio signal. The transmitter 130 transmits the radio signal from the antenna.

The controller 130 performs various types of control at the UE 100. The controller 130 includes a processor and a memory. The memory stores programs to be executed by the processor, and information to be used in processing by the processor. The processor includes a baseband processor and a central processing unit (CPU). For example, the baseband processor performs modulation/demodulation and coding/decoding of a baseband signal. The CPU performs various processes by executing the programs stored in the memory. The processor may include a codec for performing coding and decoding of audio/video signals. The processor executes various processes described later and various communication protocols described above.

The UE 100 may include a global navigation satellite system (GNSS) receiver. The GNSS receiver may receive a GNSS signal to obtain positional information indicating a geographical position of the UE 100. The GNSS receiver outputs the GNSS signal to the controller 130. The UE 100 may include a global positioning system (GPS) function for acquiring the positional information of the UE 100.

In the present specification, for the sake of convenience, a process that is performed by at least one of the receiver 110, the transmitter 120, and the controller 130 provided in the UE 100 is described as a process (operation) that is performed by the UE 100.

(Base Station)

Figure 4:
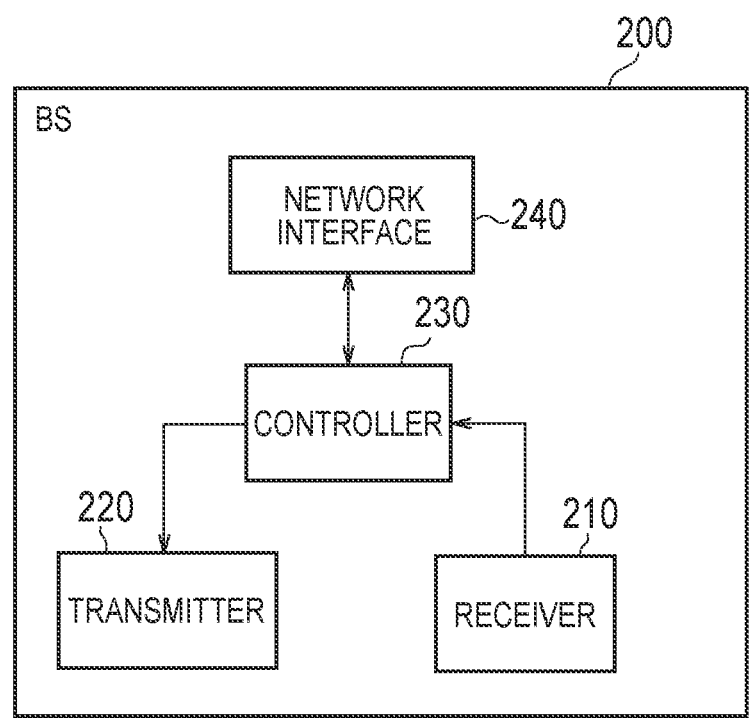
FIG. 4 is a block diagram of a BS 200.

A description will be given of the BS 200 (base station) according to the embodiment. FIG. 4 is a block diagram of the BS 200. As illustrated in FIG. 4, the BS 200 includes a receiver 210, a transmitter 220, a controller 230, and a network interface 240. The transmitter 210 and the receiver 220 may be an integrated transceiver.

The receiver 210 performs various types of reception under control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmission under control of the controller 230. The transmitter 220 includes an antenna. The transmitter 220 converts the baseband signal (transmission signal) output by the controller 230 into a radio signal. The transmitter 220 transmits the radio signal from the antenna.

The controller 230 performs various types of control at the BS 200. The controller 230 includes a processor and a memory. The memory stores programs to be executed by the processor, and information to be used in processing by the processor. The processor includes a baseband processor and a CPU. For example, the baseband processor performs modulation/demodulation and coding/decoding of a baseband signal. The CPU performs various processes by executing the programs stored in the memory. The processor executes various processes described later and various communication protocols described above.

The network interface 240 is connected to an adjacent BS 200 via the X2 interface. The network interface 240 is connected to the MME 300 and the SGW 400 via the S1 interface. For example, the network interface 240 is used for communication performed on the X2 interface and communication performed on the S1 interface.

In the present specification, for the sake of convenience, a process that is performed by at least one of the transmitter 210, the receiver 220, the controller 230, or the network interface 240 provided in the BS 200 is described as a process (operation) that is performed by the BS 200.

Operation According to Embodiment

Operations according to the embodiment will be described citing Example Operations 1 to 4 as examples.

(A) Example Operation 1

Figure 5:
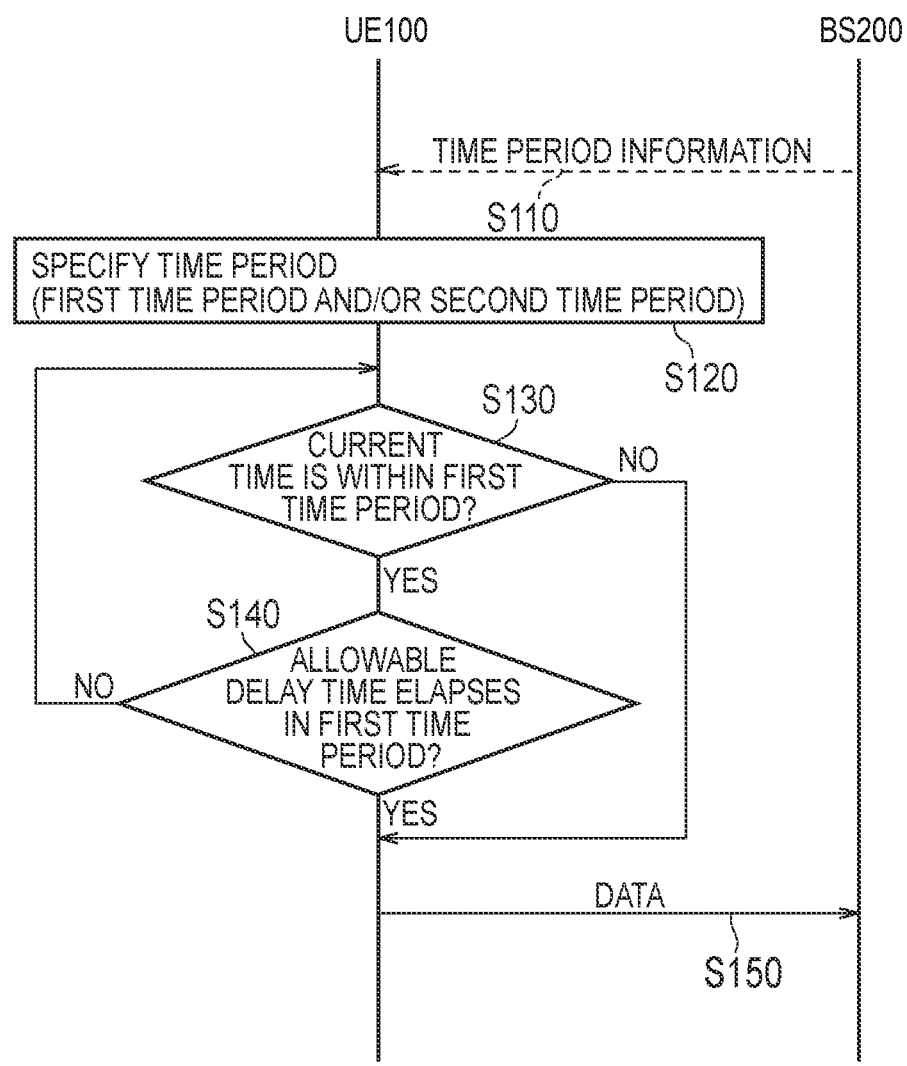
FIG. 5 is a sequence chart for describing Example Operation 1.

Example Operation 1 will be described with reference to FIG. 5. FIG. 5 is a sequence diagram for describing Example Operation 1.

The UE 100 is present in a range where signaling from the BS 200 can be received. For example, the UE 100 exists in a cell that is managed by the BS 200. The UE 100 is in the RRC connected state. Alternatively, the UE 100 may be in the RRC idle state.

As illustrated in FIG. 5, in step S110, the BS 200 may transmit time period information to the UE 100. The UE 100 may receive the time period information from the BS 200.

The BS 200 may transmit the time period information to the UE 100 by dedicated signaling (such as by an RRC connection reconfiguration message). The BS 200 may transmit the time period information to the UE 100 by broadcast signaling (such as by a system information block (SIB))/group-cast signaling.

The time period information may be issued from the Server 600 to the UE 100 (through the BS 200). The time period information may be issued from the MME 300 to the UE 100 (through the BS 200). The time period information may be issued to the UE 100 by NAS signaling. In this manner, the UE 100 is capable of receiving the time period information from the network.

The time period information may be written in advance (i.e., stored in advance) in a subscriber identity module card (SIM) that is attached to the UE 100. The time period information stored in the SIM may be remotely rewritten.

The time period information may include at least one of a first information element and a second information element. The first information element is used to specify a first time period in which communication with the network is restricted. The second information element is used to specify a second time period in which communication with the network is allowed.

The first time period may be indicated by time. For example, the first information element may indicate a start time and/or an end time of the first time period. The time may be defined by coordinated universal time (UTC).

The first time period may be indicated by system time. For example, the first information element may indicate a hyper system frame number (H-SFN) indicating the first time period. The first information element may indicate the H-SFN and a system frame number (SFN) indicating the first time period.

The first time period may also be indicated by time information. For example, the first time period may be indicated by time information defined by a network time protocol (NTP) or a simple network time protocol (SNTP). The NTP and the SNTP are used by a network (NTP server) to provide information about time (synchronization information).

The second information element may likewise indicate the start time and/or the end time of the first time period. The second information element may also indicate the H-SFN (and the SFN) indicating the second time period.

In step S120, the UE 100 specifies the time period.

The UE 100 may specify the first time period on the basis of at least one of the first information element and the second information element.

The UE 100 may specify the time period indicated by the first information element, as the first time period. The UE 100 may specify the time period indicated by the second information element, as the second time period. The UE 100 may specify a time period different from the second time period which is specified, as the first time period.

In step S130, the UE 100 determines whether or not a current time is within the first time period.

The UE 100 may perform the process in step S140 in response to determining that the current time is within the first time period. Alternatively, the UE 100 may perform the process in step S130 again.

The UE 100 may perform the process in step S150 in response to determining that the current time is not within the first time period (i.e., outside the first time period). The UE 100 may perform the process in step S150 in response to determining that the current time is within the second time period.

The UE 100 may perform the determination in response to generation of data (transmission data/transmission packet) to be transmitted to the network. The UE 100 may perform the determination regardless of whether the transmission data is generated or not.

The UE 100 may stop generation of the transmission data in response to determining that the current time is within the first time period. The UE 100 may stop generation of the transmission data in an upper layer (such as an application layer) in the UE 100. The UE 100 may start generation of the transmission data in response to determining that the current time is not within the first time period.

The UE 100 may start a timer in response to generation of the transmission data. For example, the UE 100 may start a timer in response to data entering a transmission buffer.

The timer is a timer for measuring a retention time of the transmission data. The UE 100 may transmit the transmission data to the network in response to expiration of the timer, even when the current time is within the first time period.

One timer may be configured for the UE 100. A timer corresponding to each packet (transmission packet) to be transmitted to the network may be configured for the UE 100. That is, the UE 100 may start the timer for each packet. A timer corresponding to each Internet protocol (IP) flow (stream) may be configured for the UE 100. That is, the UE 100 may start the timer for each IP flow (stream).

A timer value is a value corresponding to an allowable delay time for the transmission data. The timer value may be a value that is smaller than the allowable delay time for the transmission data. The timer value may be a value corresponding to a smallest allowable delay time among the allowable delay times for a plurality of packets.

The timer value (a value corresponding to the allowable delay time for the transmission data) is a value that does not exceed the allowable delay time. The timer value is a value at which the UE 100 can transmit the transmission data before the allowable delay time is exceeded (such as immediately before the allowable delay time).

In the UE 100, the allowable delay time (the timer value) may be issued from an upper layer to a lower layer. For example, the upper layer is the application layer or the NAS layer. For example, the lower layer is at least one of the NAS layer, the RRC layer, the PDCP layer, the RLC layer, the MAC layer, or the PHY layer.

The BS 200 may transmit information indicating the timer value to the UE 100 by dedicated signaling (such as by an RRC connection reconfiguration message). The BS 200 may transmit the information indicating the timer value to the UE 100 by broadcast signaling (such as by an SIB)/group-cast signaling. The time period information may include an information element indicating the timer value.

In step S140, the UE 100 determines whether or not the allowable delay time for the transmission data elapses in the first time period. That is, the UE 100 determines whether or not the allowable delay time for the transmission data elapses before the end of the first time period.

The UE 100 may perform the process in step S150 in response to determining that the allowable delay time for the transmission data elapses in the first time period. The UE 100 may perform the process in step S130 in response to determining that the allowable delay time for the transmission data does not elapse in the first time period.

In step S150, the UE 100 may transmit the transmission data to the network in the second time period, for example.

In the first time period, the UE 100 performs control for restricting communication with the network. For example, even in a case where transmission data (transmission packet) is generated, the UE 100 does not have to perform communication with the network in the first time period. Even in a case where data is accumulated in the transmission buffer, the UE 100 does not have to perform communication with the network in the first time period. The UE 100 may perform communication with the network in the second time period, without performing communication with the network in the first time period.

In the case where the allowable delay time for the transmission data elapses in the first time period, the UE 100 may transmit the transmission data (transmission packet) to the network in the first time period. For example, the UE 100 may transmit the transmission data to the network even if the current time is in the first time period, in response to expiration of the timer mentioned above. In this manner, the UE 100 may transmit the transmission data to the network in the first time period, as an exception, and reduction in communication quality may be prevented even in a case where the first time period is set.

"Communication with a network" may be just uplink transmission from the UE 100 to the network. Accordingly, the first time period may be a time period in which transmission from the UE 100 to the network is rejected. The second time period may be a time period in which transmission from the UE 100 to the network is allowed.

Communication with the network may include not only uplink transmission, but also downlink transmission from the network to the UE 100. For example, the UE 100 may omit operation of receiving radio signals from the network in the first time period. For example, the UE 100 may omit to monitor paging messages (PDCCH).

For example, the UE 100 may be placed in a sleep state in the first time period by application of extended DRX. The UE 100 may be placed in the sleep state in the first time period by application of a power saving mode (PSM) configured and controlled by NAS that allows reduction in power consumption of the UE.

For its part, the network (such as the eNB 200 or the MME 300) may omit transmission of information (user data and/or control information) to be transmitted to the UE 100, in the first time period. For example, the network may specify the first time period on the basis of the time period information. The network may receive, from the UE 100, information indicating the time period (the first time period and/or the second time period) specified in step S120. The network may omit transmission of information to be transmitted to the UE 100, in the time period specified by the UE 100. The UE 100 may notify the network of the specified time period, before entering the sleep state. The network is thereby enabled to omit needless transmission to the UE 100.

As described above, in the first time period, the UE 100 performs control for restricting communication with the network. A traffic volume of the UE 100 in the first time period is thereby reduced. Smoothing of traffic may be achieved by setting the first time period in a time period with a high overall traffic volume (such as a time period from daytime to midnight).

Because each UE 100 autonomously specifies the first time period, instead of a network apparatus (such as the M2M server) specifying a communication timing of each UE 100, a load on the network apparatus may be reduced.

(B) Example Operation 2

Figure 6:
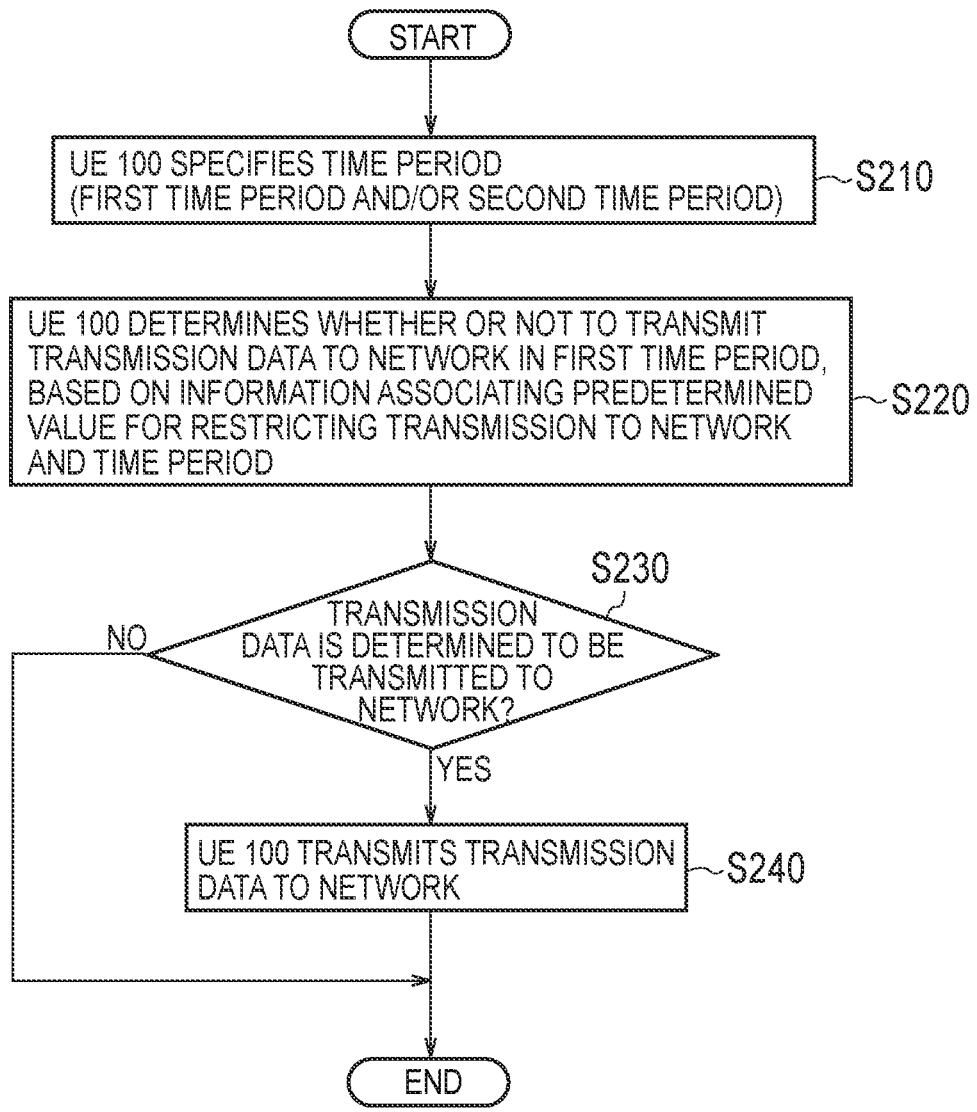
FIG. 6 is a flowchart for describing Example Operation 2.

Example Operation 2 will be described with reference to FIG. 6. FIG. 6 is a flowchart for describing Example Operation 2. A description overlapping the description given above will be omitted.

In Example Operation 2, the UE 100 determines whether or not to transmit transmission data to the network in the first time period, on the basis of information associating a predetermined value for restricting transmission to the network and a time period.

As illustrated in FIG. 6, the UE 100 specifies a time period (the first time period and/or the second time period) in step S210. To specify a time period, the UE 100 may use information in Table 1 as the time period information. Table 1 indicates an example of the time period information. As in Example Operation 1, the UE 100 may receive the time period information from the BS 200. Alternatively, as in Example Operation 1, the UE 100 may store the same in advance.

TABLE 1

| Time Slot | Probability Threshold |
|---|---|
| 2:00-6:00 | 0 |
| 6:00-12:00 | 0.5 |
| 12:00-17:00 | 0.7 |
| 17:00-2:00 | 0.9 |

In Table 1, a probability threshold (predetermined value) indicating a transmission probability with respect to the network and each time period in a day are associated with each other. The probability threshold is used by the UE 100 to determine whether or not to transmit transmission data to the network in the first time period.

For example, the UE 100 may specify, as the first time period, a time period (such as 0:00-2:00, 6:00-24:00) that is associated with a probability threshold indicating a numerical value other than "0". The UE 100 may specify, as the second time period, a time period (such as 2:00-6:00) that is associated with a probability threshold indicating "0". The UE 100 may specify, as the first time period, all the time periods (0:00-24:00) of the time periods for one day.

In step S220, the UE 100 may determine whether or not to transmit transmission data to the network in the first time period, on the basis of the information associating the predetermined value for restricting transmission to the network and the time period. The UE 100 may perform the process in step S240 in response to determining that the transmission data is to be transmitted to the network (step S230: YES).

For example, the UE 100 may perform the determination by using a random number. For example, the UE 100 may compare a random number and the probability threshold.

The UE 100 may determine transmission of the transmission data to the network, in a case where the random number is greater than the probability threshold. The UE 100 may determine that the transmission data is not to be transmitted to the network, in a case where the random number is at or smaller than the probability threshold.

For example, the UE 100 may perform the determination by using an UE identifier (such as an international mobile subscriber identity (IMSI)). The UE 100 may determine transmission of the transmission data to the network, in a case where a value obtained by dividing the UE identifier by a constant takes a predetermined value. The UE 100 may determine that the transmission data is not to be transmitted to the network, in a case where the value obtained by dividing the UE identifier by a constant does not take a predetermined value. In this case, the predetermined value and each time period in a day are associated with each other in the time period information. The time period information may include an information element indicating the constant.

The UE 100 may perform the determination in an upper layer. The UE 100 may start generation of the transmission data in response to determining that the transmission data is to be transmitted to the network. In the UE 100, the upper layer may instruct a lower layer to generate the transmission data, in response to determination that the transmission data is to be transmitted to the network. For example, the upper layer is the application layer or the NAS layer. For example, the lower layer is at least one of the NAS layer, the RRC layer, the PDCP layer, the RLC layer, the MAC layer, or the PHY layer.

As in Example Operation 1, even in a case where the transmission data is determined not to be transmitted to the network, the UE 100 may transmit the transmission data to the network in response to expiration of the timer mentioned above, even when the current time is within the first time period.

In step S240, the UE 100 transmits the transmission data to the network in response to determining that the transmission data is to be transmitted to the network.

On the other hand, when the transmission data is determined not to be transmitted to the network, the UE 100 ends the processing (step S230: NO).

It is possible to enable the UE 100 to perform the determination only once in a predetermined time period. The UE 100 may be disabled from performing the determination until the end of a predetermined time period (such as 6:00-12:00). The UE 100 may start the determination in response to a predetermined time period (the first time period) being switched to the second time period. The UE 100 may start the determination in response to a predetermined time period (such as 6:00-12:00) being switched to a next time period (such as 12:00-17:00).

The UE 100 may activate a timer for restricting the number of times of determination (or transmission) in response to performing the determination. The UE 100 may be disabled from performing the determination until expiration of the timer. The UE 100 may start the determination in response to expiration of the timer. The UE 100 may be enabled to activate the timer only in a case where the transmission data is determined not to be transmitted to the network. Alternatively, the UE 100 may activate the timer not only in a case where the transmission data is determined not to be transmitted to the network, but also in a case where the transmission data is determined to be transmitted to the network.

The UE 100 may determine the number of times of determination in such a way that the transmission probability in one first time period becomes constant. A description will be given citing a case where the transmission probability is 0.5 as an example.

For example, in a case where the probability threshold is 0.5, the UE 100 may determine the number of times of determination to be one. For example, in a case where the probability threshold is 0.71 (i.e., approximately equal to √0.5), the UE 100 may determine the number of times of determination to be two. For example, in a case where the probability threshold is 0.84 (i.e., approximately equal to $(0.5)^{0.25}$), the UE 100 may determine the number of times of determination to be four. The UE 100 may determine a random number in each determination. The UE 100 may determine that the transmission data is to be transmitted to the network, in a case where the random number is greater than the probability threshold. The UE 100 may determine that the transmission data is not to be transmitted to the network, in a case where the random number is at or smaller than the probability threshold.

The number of times of determination in one first time period may be specified by the network. The UE 100 may perform the determination according to the specified number of times of determination. The UE 100 may determine the probability threshold from the number of times of determination and the transmission probability.

The BS 200 may transmit, to the UE 100, information indicating at least one of the timer value, the number of times of determination, the probability threshold, and the transmission probability by dedicated signaling (such as by an RRC connection reconfiguration message). The BS 200 may transmit the information to the UE 100 by broadcast signaling (such as by an SIB)/group-cast signaling. The time period information may include an information element indicating at least one of the timer value, the number of times of determination, the probability threshold, and the transmission probability.

(C) Example Operation 3

Figure 7:
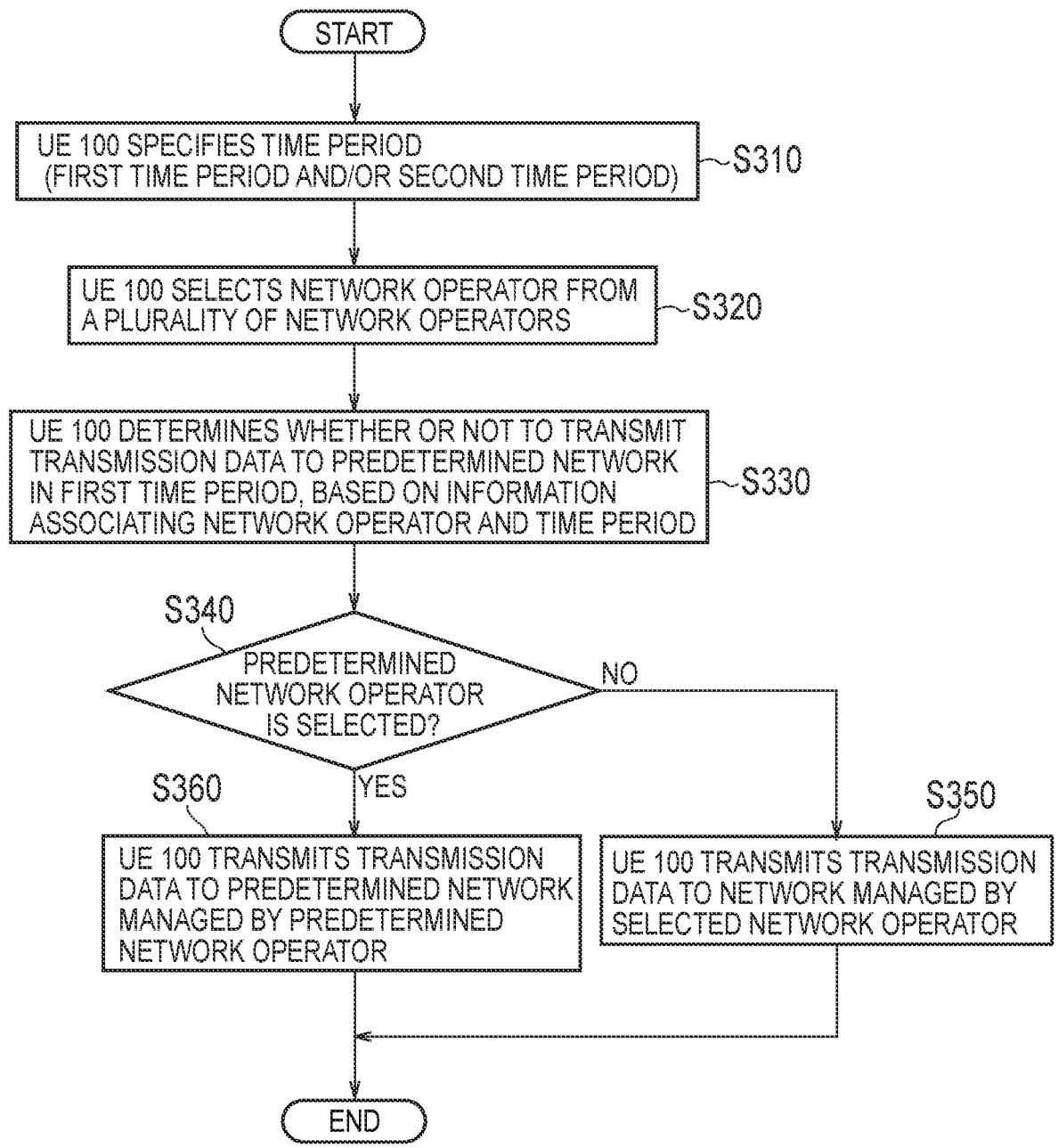
FIG. 7 is a flowchart for describing Example Operation 3.

Example Operation 3 will be described with reference to FIG. 7. FIG. 7 is a flowchart for describing Example Operation 3. A description overlapping the description given above will be omitted.

In Example Operation 3, the UE 100 determines whether or not to transmit data to the network in the first time period, on the basis of information associating a network operator and a time period.

As illustrated in FIG. 7, the UE 100 specifies a time period (the first time period and/or the second time period) in step S310. To specify a time period, the UE 100 may use information in Table 2 as the time period information. Table 2 indicates an example of the time period information. As in Example Operation 1, the UE 100 may receive the time period information from the BS 200. Alternatively, as in Example Operation 1, the UE 100 may store the same in advance.

TABLE 2

| Time Slot | Probability Threshold |
| --- | --- |
| 2:00-6:00 | ALL |
| 6:00-12:00 | A operator |
| 12:00-17:00 | B operator |
| 17:00-2:00 | C or D operator |

In Table 2, a network operator and each time period in a day are associated with each other.

The UE 100 may specify, as the first time period, a time period (such as 6:00-12:00) that is associated with a predetermined network operator (such as A operator). The UE 100 may specify, as the second time period, a time period (such as 2:00-6:00) that is associated with "ALL" indicating that transmission to a network managed by any of the network operators is allowed.

A plurality of network operators (such as C or D operator) may be associated with one time period (such as 17:00-24:00 or 0:00-2:00). In this case, the UE 100 may select an arbitrary network operator from the plurality of network operators.

In step S320, the UE 100 selects a network operator managing the network which is a transmission destination of the transmission data (transmission packet), from a plurality of network operators, on the basis of the time period information. The UE 100 may select the network as the transmission destination of the transmission data from a plurality of networks. The UE 100 may select a public land mobile network (PLMN) as the transmission destination of the transmission data, from a plurality of PLMNs.

Specifically, the UE 100 determines whether or not the current time is within the first time period. In the case where the current time is within the first time period, the UE 100 selects a predetermined network operator that is associated with the time period including the current time. The UE 100 does not select network operators other than the predetermined network operator that is associated with the time period including the current time.

In step S330, the UE 100 may determine whether or not to transmit the transmission data to the network (the predetermined network) in the first time period, on the basis of the information associating the network operator and the time period.

In the case where the predetermined network is selected in step S340, the UE 100 performs the process in step S350. In the case where an operator other than the predetermined network operator is selected, the process in step S360 is performed.

In step S350, the UE 100 transmits the transmission data to the network managed by the predetermined network operator.

In step S360, the UE 100 transmits the transmission data to the network managed by the selected network operator.

As described above, the UE 100 may determine whether or not to transmit the transmission data to the network, with respect to a predetermined network. That is, the UE 100 may determine (select) the network to which the transmission data is to be transmitted, on the basis of the time period information. Because the network operator is selected (specified) according to the time period, concentration of a load on a network managed by one network operator may be alleviated.

(D) Example Operation 4

Figure 8:
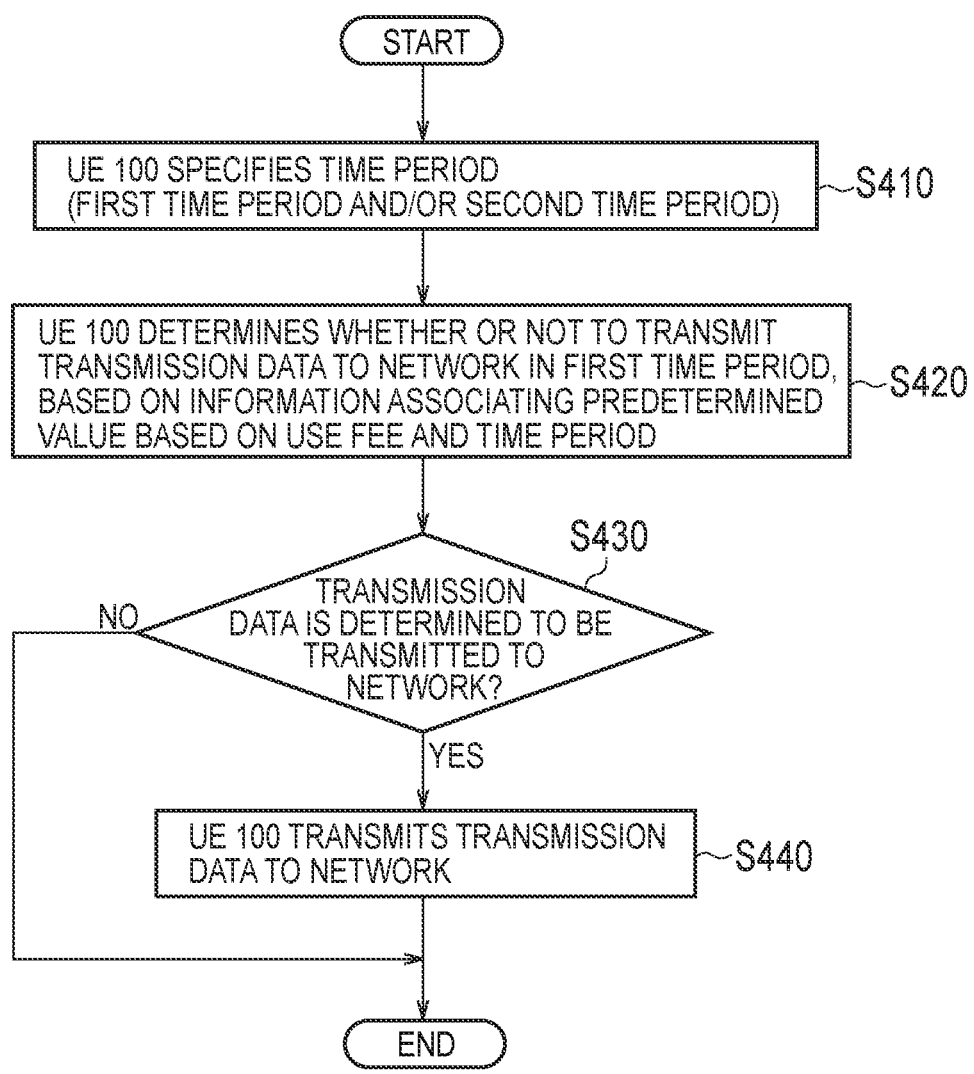
FIG. 8 is a flowchart for describing Example Operation 4.

Example Operation 4 will be described with reference to FIG. 8. FIG. 8 is a flowchart for describing Example Operation 4. A description overlapping the description given above will be omitted.

In Example Operation 4, the UE 100 determines whether or not to transmit data to the network in the first time period, on the basis of information associating a predetermined value based on a use fee and a time period.

As illustrated in FIG. 8, the UE 100 specifies a time period (the first time period and/or the second time period) in step S410. To specify a time period, the UE 100 may use information in Table 3 as the time period information. Table 3 indicates an example of the time period information. As in Example Operation 1, the UE 100 may receive the time period information from the BS 200. Alternatively, as in Example Operation 1, the UE 100 may store the same in advance.

TABLE 3

| Amount of | | Fee Information | |
|---|---|---|---|
| Data | Time Slot | A operator | B operator |
| 1 Mbps | 2:00-6:00 | ¥0.1/packet | ¥0.05/packet |
|  | 6:00-12:00 | ¥0.1/packet | ¥0.1/packet |
|  | 12:00-17:00 | ¥0.2/packet | ¥0.2/packet |
|  | 17:00-2:00 | ¥1.0/packet | ¥1.2/packet |
| 10 kbps | 2:00-6:00 | ¥0.05/packet | ¥0.01/packet |
|  | 6:00-12:00 | ¥0.05/packet | ¥0.03/packet |
|  | 12:00-17:00 | ¥0.1/packet | ¥0.2/packet |
|  | 17:00-2:00 | ¥0.5/packet | ¥1.0/packet |

Table 3 associates a predetermined value based on a use fee (packet-based fee) and each time period in a day. As shown in Table 3, a predetermined value based on the use fee of each network operator and each time period in a day may be associated with each other. A predetermined value based on a use fee and each time period in a day may be associated with each other for each amount of transmission data.

The predetermined value based on a use fee does not have to be a packet-based fee, and may be other fees (such as a monthly fee).

The predetermined value based on a use fee may be a degree of priority. For example, the degree of priority may be higher, the lower the use fee.

The predetermined value based on a use fee may be a standardized value (relative value). The use fee for other than the predetermined network operator may be standardized on the basis of the use fee for the predetermined network operator.

The predetermined value based on a use fee may be the probability threshold described above. For example, the probability threshold may be smaller, the lower the use fee.

The predetermined value based on a use fee and each time period in a day may be associated with each other for each throughput.

In the case where the predetermined value based on a use fee and each time period in a day are associated with each other, the UE 100 may specify each time period as the first time period. The UE 100 may specify, as the second time period, a time period in which the use fee is the same for all the network operators.

In step S420, the UE 100 determines whether or not to transmit the transmission data to the network in the first time period, on the basis of the time period information. The UE 100 may perform the process in step S440 in response to determining that the transmission data is to be transmitted to the network (step S430: YES).

For example, the UE 100 may compare, with a threshold, a predetermined value based on the use fee associated with the time period including the current time. For example, the threshold is an allowable use fee (such as ¥A/packet). The UE 100 may determine that the transmission data is to be transmitted to the network, in a case where the predetermined value is smaller than the threshold. The UE 100 may determine that the transmission data is not to be transmitted to the network, in a case where the predetermined value is at or greater than the threshold.

A case where the UE 100 with an amount of data of 1 Mbps uses the B operator will be described as an example. Between 2:00-6:00, the predetermined value (¥0.05/packet) is smaller than the threshold (¥0.1/packet), and thus, the UE 100 determines that the transmission data is to be transmitted to the network managed by the B operator. On the other hand, between 12:00-17:00, the predetermined value (¥1.2/packet) is at or greater than the threshold (¥0.1/packet), and thus, the UE 100 determines that the transmission data is not to be transmitted to the network managed by the B operator.

The threshold may be set by a user of the UE 100. The UE 100 may acquire information indicating the threshold from the network (such as the BS 200). The time period information may include an information element indicating the threshold.

As in Example Operation 3, the UE 100 may select a network operator managing the network which is the transmission destination of the transmission data from a plurality of network operators, on the basis of the time period information according to Example Operation 4. That is, the UE 100 may autonomously select an optimal network (communication path).

For example, the UE 100 may select a network with a low use fee.

The UE 100 may select a network on the basis of information regarding the transmission data that is being generated. For example, the UE 100 may select a network on the basis of the amount of transmission data. The UE 100 may select a network on the basis of an allowable delay time for the transmission data.

The UE 100 may select a network on the basis of performance information of the UE 100. For example, the UE 100 may select a network on the basis of a maximum throughput.

An algorithm used by the UE 100 to select a network may be changed. For example, the UE 100 may select a network on the basis of a fee-oriented algorithm. Alternatively, for example, the UE 100 may select a network on the basis of a performance-oriented algorithm.

A user of the UE 100 may change (configure) the algorithm for selecting the network. The UE 100 may acquire the algorithm for selecting the network, from the network.

In step S440, the UE 100 transmits the transmission data to the network in response to determining that the transmission data is to be transmitted to the network. On the other hand, the UE 100 ends the processing in response to determining that the transmission data is not to be transmitted to the network (step S430: NO).

In the case where a network as the transmission destination of the transmission data is selected from a plurality of networks, the UE 100 may transmit the transmission data to the selected network (i.e., through a selected communication path).

For example, the UE 100 may re-select the network (the communication path) in response to at least one of the time period, the amount of transmission data, or the allowable delay time of the transmission being changed.

Other Embodiments

The contents of the present application have been described through the embodiment described above. However, the descriptions and drawings forming a part of the disclosure should not be understood to limit the present application. Various alternative embodiments, examples, and operation techniques are made obvious to those skilled in the art from the disclosure.

Figure 9:
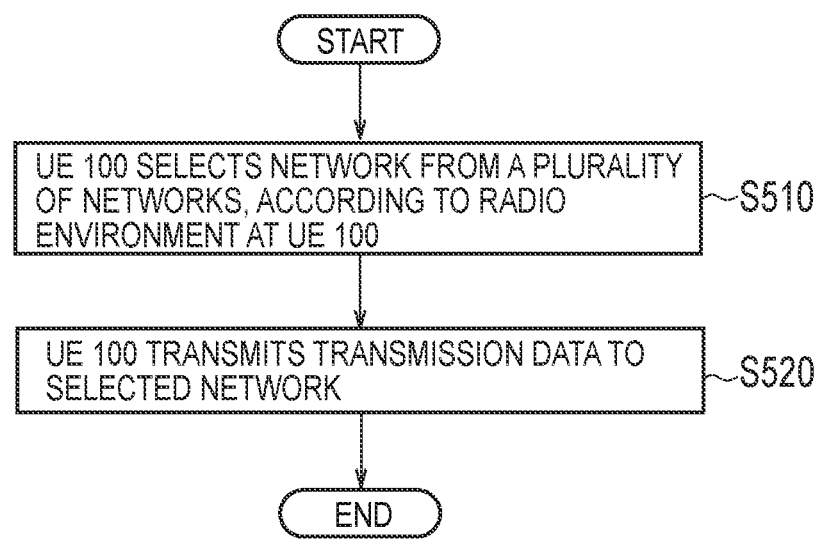
FIG. 9 is a flowchart for describing an operation of the UE 100 according to another embodiment.

In the embodiment described above, the UE 100 determines the network to which the transmission data is to be transmitted, on the basis of the time period information, but such a case is not restrictive. For example, as illustrated in FIG. 9, the UE 100 may determine (select) the network (the network operator) to which the transmission data is to be transmitted, according to radio environment of the network at the UE 100. FIG. 9 is a flowchart for describing an operation of the UE 100 according to another embodiment.

In step S510, the UE 100 may determine the network to which the transmission data is to be transmitted, according to a reference signal received power (RSRP) of a radio signal from the network (such as the BS 200), for example. The UE 100 may determine the network by using information in Table 4. Table 4 is a list indicating an example association between the reference signal received power and the use fee (such as a packet-based communication fee) of each network operator.

TABLE 4

| Reference Signal Received Power | A operator | B operator |
|---|---|---|
| −90 dBm or higher | ¥0.1/packet | ¥0.1/packet |
| −90~−95 dBm | ¥0.2/packet | ¥0.1/packet |
| −95~−100 dBm | ¥0.2/packet | ¥0.2/packet |
| −100~−115 dBm | ¥0.3/packet | ¥0.2/packet |
| −115 dBm or lower | ¥0.3/packet | ¥0.3/packet |

The UE 100 may select the network with the lowest communication fee on the basis of the current reference signal received power, by using the list. For example, in the case where the reference signal received power of a radio signal (such as a reference signal) from each of the network managed by the A operator and the network managed by the B operator is within a range of "−90 to −95 dBm", the UE 100 may select the network managed by the B operator. In the case where the reference signal received power of the radio signal from the network managed by the A operator is within the range of "−90 to −95 dBm" and the reference signal received power of the radio signal from the network managed by the B operator is within a range of "−115 dBm or lower", the UE 100 may select the network managed by the A operator.

The UE 100 may determine the network to which the transmission data is to be transmitted, using a reference different from the reference signal received power. The UE 100 may determine the network to which the transmission data is to be transmitted, according to a reference signal received quality (RSRQ).

The UE 100 may determine the network to which the transmission data is to be transmitted, using a reference different from the reference signal received power. For example, the UE 100 may determine the network to which the transmission data is to be transmitted, according to the reference signal received quality (RSRQ) of the radio signal from each network. The reference signal received quality and the network operator (network) may be associated with each other in a list used for determination.

The UE 100 may determine the network to which the transmission data is to be transmitted, according to a coverage enhancement (CE) mode. The CE mode (CE mode A and CE mode B) and the use fee (such as a packet-based communication fee) of each network operator (network) may be associated with each other in a list used for determination. The CE mode may be configured for the UE 100 by the network (the BS 200). The UE 100 may autonomously determine the CE mode. For example, the UE 100 may determine the CE mode of the UE 100 itself by using a threshold that is compared with a received level (such as RSRP or RSRQ) of the radio signal from the network (the BS 200).

The UE 100 may determine the network to which the transmission data is to be transmitted, according to a CE level. The CE level and the network operator (network) may be associated with each other in a list used for determination.

The BS 200 may transmit the list to the UE 100 by dedicated signaling (such as by an RRC connection reconfiguration message). The BS 200 may transmit the list to the UE 100 by broadcast signaling (such as by an SIB)/group-casting signaling.

As in Example Operation 4, the UE 100 may autonomously select an optimal network (communication path) by using the list.

In step S520, the UE 100 may transmit the transmission data to the selected network (i.e., through the selected communication path).

In the embodiment described above, the UE 100 for which transmission to the network is restricted may be specified. The network (such as the BS 200) may include, in the time period information, a specification information element for specifying the UE 100 for which transmission to the network is restricted. For example, the specification information element may indicate a category of the UE 100 for which transmission to the network is restricted. For example, the specification information element may indicate a UE that uses Nb-IoT. The UE 100 may perform the operations as described above by using the time period information, in the case where the specification information element indicates the UE 100 itself.

In the embodiment described above, the UE 100 is restricted from performing transmission to the network in the case where the current time is within the first time period, but such a case is not restrictive. For example, the UE 100 may perform the determination described above regardless of whether the current time is within the first time period or not. The UE 100 may select the optimal network (communication path) regardless of whether the current time is within the first time period or not. In the case where the UE 100 is able to transmit the transmission data before a lapse of the allowable delay time, regardless of the determination result, the UE 100 may determine whether to transmit the transmission data to the network or not, regardless of whether the current time is within the first time period or not.

In the embodiment described above, the UE 100 may be a sensor module (an M2M device). The UE 100 may be a radio communication apparatus (such as Internet of Things gateway (IoT GW)) that manages (a plurality of) sensor modules. The UE 100 may represent the (plurality of) sensor modules and perform communication with the network. The sensor modules managed by the IoT GW do not have to include the function of performing communication with the network. The sensor modules managed by the IoT GW may include the function of performing communication with the IoT GW.

The UE 100, which is a sensor module, may receive the time period information described above from the IoT GW.

Contents according to the embodiments described above (Example Operations) may be performed in combination with each other as appropriate. For example, the UE 100 may select the optimal network by using the lists in Table 3 and Table 4. Furthermore, in each sequence described above, not all the operations are necessarily requisite. For example, it is possible to have only one or some of the operations performed in each sequence.

Although not particularly stated in the embodiments described above, there may be provided a program for causing a computer to perform each process that is to be performed by any one of the nodes (the UE 100, the BS 200, the network apparatus (such as the Server 600), etc.) described above. The program may be recorded in a computer-readable medium. The program may be installed in a computer by using the computer-readable medium. The computer-readable medium where the program is recorded may be a non-transitory recording medium. The non-transitory recording medium may be, but not limited to, recording media such as CD-ROMs and DVD-ROMs.

There may be provided a chip including a memory storing the program for executing each process that is to be performed by any one of the UE 100, the BS 200, or the network apparatus, and a processor for executing the program stored in the memory.

In the embodiments described above, an LTE system is described as an example of the mobile communication system, but the contents of the present application may be applied to systems other than the LTE system, without being limited to the LTE system. For example, the contents of the present application may be applied to a communication system for 5G.

INDUSTRIAL APPLICABILITY

The present invention is useful in the field of radio communication.

The invention claimed is:

1. A radio communication apparatus comprising a processor and a memory, wherein the processor is configured to
    specify a plurality of time periods in which communication with a network is restricted,
    perform control in the plurality of time periods to restrict the communication with the network,
    receive, from the network, information associating each of a plurality of probability thresholds for restricting transmission to the network and each of the plurality of time periods, and
    determine whether or not to transmit data to the network in one time period of the plurality of time periods, on a basis of the information, wherein
    the processor is configured to generate a random number and determine whether or not to transmit the data to the network in the one time period, on the basis of a result of comparison between the random number and the probability threshold, and
    the processor is configured to determine a number of times of determination in each of the plurality of time periods on a basis of each of the plurality of probability thresholds.

2. The radio communication apparatus according to claim 1, wherein the processor is configured to
    specify a second time period in which the communication with the network is allowed, and
    perform the communication in the second time period without performing the communication in the one time period.

3. The radio communication apparatus according to claim 1, wherein the processor is configured to transmit data to the network in the one time period, when an allowable delay time for the data that is to be transmitted to the network elapses in the one time period.

4. The radio communication apparatus according to claim 1, wherein the processor is configured to
    receive, from the network, information including at least one of a first information element for specifying the plurality of time periods and a second information element for specifying a second time period in which the communication with the network is allowed, and
    specify the plurality of time periods on a basis of at least one of the first information element and the second information element.

5. The radio communication apparatus according to claim 1, wherein the processor is configured to
    select a network operator from a plurality of network operators, on a basis of information associating the network operator and a time period, and
    determine to transmit data to a network managed by the selected network operator.

6. The radio communication apparatus according to claim 1, wherein the processor is configured to determine whether or not to transmit data to the network in the one time period, on a basis of information associating a predetermined value based on a use fee and a time period.

7. A processor for controlling a radio communication apparatus, wherein the processor is configured to
    specify a plurality of time periods in which communication with a network is restricted,
    perform control in the plurality of time periods to restrict the communication with the network,
    receive, from the network, information associating each of a plurality of probability thresholds for restricting transmission to the network and each of the plurality of time periods, and
    determine whether or not to transmit data to the network in one time period of the plurality of time periods, on a basis of the information, wherein
    the processor is configured to generate a random number and determine whether or not to transmit the data to the network in the one time period, on the basis of a result of comparison between the random number and the probability threshold, and
    the processor is configured to determine a number of times of determination in each of the plurality of time periods on a basis of each of the plurality of probability thresholds.

8. A control method of a radio communication apparatus comprising:
    specifying, by the radio communication apparatus, a plurality of time periods in which communication with a network is restricted;
    performing, by the radio communication apparatus, control in the plurality of time periods to restrict the communication with the network,
    receiving, from the network, information associating each of a plurality of probability threshold thresholds for restricting transmission to the network and each of the plurality of time periods, and
    determining whether or not to transmit data to the network in one time period of the plurality of time periods, on a basis of the information, wherein
    in determining whether or not to transmit data to the network, a random number is generated and it is determined whether or not to transmit the data to the network in the one time period, on the basis of a result of comparison between the random number and the probability threshold, and determining a number of times of determination in each of the plurality of time periods on a basis of each of the plurality of probability thresholds.

\* \* \* \* \*